United States Patent
Guo et al.

(10) Patent No.: US 10,962,626 B2
(45) Date of Patent: Mar. 30, 2021

(54) DATA TRANSMISSION METHOD, DEVICE AND RADAR APPARATUS

(71) Applicant: Beijing Orion Star Technology Co., Ltd., Beijing (CN)

(72) Inventors: Weiwei Guo, Beijing (CN); Kunlin Yu, Beijing (CN); Chao Sho (Jiang), Beijing (CN)

(73) Assignee: Beijing Orion Star Technology Co., Ltd.

( * ) Notice: Subject to any disclaimer, the term of this patent is extended or adjusted under 35 U.S.C. 154(b) by 0 days.

(21) Appl. No.: 16/491,526

(22) PCT Filed: Mar. 5, 2018

(86) PCT No.: PCT/CN2018/077997
§ 371 (c)(1),
(2) Date: Sep. 5, 2019

(87) PCT Pub. No.: WO2018/161869
PCT Pub. Date: Sep. 13, 2018

(65) Prior Publication Data
US 2020/0049792 A1    Feb. 13, 2020

(30) Foreign Application Priority Data
Mar. 6, 2017    (CN) .......................... 201710129387.4

(51) Int. Cl.
*G01S 7/00*    (2006.01)
*G01S 17/42*    (2006.01)
(Continued)

(52) U.S. Cl.
CPC .............. *G01S 7/003* (2013.01); *G01S 17/42* (2013.01); *H04L 1/0061* (2013.01)

(58) Field of Classification Search
None
See application file for complete search history.

(56) References Cited

U.S. PATENT DOCUMENTS 3,184,739 A * 5/1965 Franklin et al. ........ G01S 13/46
342/16
3,487,462 A * 12/1969 Holberg ................ G01S 13/003
342/59
(Continued)

FOREIGN PATENT DOCUMENTS

CN        201974523          9/2011
CN        103399311 A        11/2013
(Continued)

OTHER PUBLICATIONS

Anonymous: "Telegram Listing Ranging Sensors LMS1xx, LMS5xx, TiM5xx, NAV310, LD-OEM15xx, LD-LRS36xx", Technical Information 8014631 Detection and Ranging Solutions, SICK Sensor Intelligence, 2016, 188 pages.

*Primary Examiner* — Bernarr E Gregory
(74) *Attorney, Agent, or Firm* — McDonnell Boehnen Hulbert & Berghoff LLP

(57) ABSTRACT

The embodiment of the present application discloses a data transmission method, device, and radar device, and relates to the field of communication technologies, wherein the method is applied to a radar device, including: determining the starting data acquisition location as the target location; obtaining data acquired by the radar device during the process of rotating by a preset angle from the target location, wherein the preset angle is an angle within a range of (0°, $Max_A$), and $Max_A$ indicates the maximum rotation angle; packaging the acquired data to generate a target data package; Sending the target data package to the destination device. The data is transmitted by using the solution provided by the embodiment of the present application, and the data delay is reduced.

20 Claims, 2 Drawing Sheets

(51) Int. Cl.
*H04L 1/00* (2006.01)
*G01S 13/00* (2006.01)

(56) References Cited

U.S. PATENT DOCUMENTS

| | | | | |
|---|---|---|---|---|
| 3,533,104 A * | 10/1970 | Habegger et al. | ..... | G02B 27/01 342/34 |
| 4,843,397 A * | 6/1989 | Galati | ..... | G01S 13/42 342/354 |
| 5,164,985 A * | 11/1992 | Nysen | ..... | H04B 1/54 380/271 |
| 5,294,930 A * | 3/1994 | Li | ..... | G01S 13/003 244/3.12 |
| 6,104,712 A * | 8/2000 | Robert | ..... | H04L 1/1607 342/57 |
| 6,828,922 B1 * | 12/2004 | Gremmert | ..... | G01S 7/003 340/949 |
| 6,915,135 B1 * | 7/2005 | McKee et al. | ..... | G01S 7/003 455/456.6 |
| 7,039,367 B1 * | 5/2006 | Kucik | ..... | G08C 17/02 244/190 |
| 7,158,072 B1 * | 1/2007 | Venkatachalam | ..... | G01S 7/003 342/26 B |
| 7,868,814 B1 * | 1/2011 | Bergman | ..... | G01S 7/003 340/945 |
| 8,089,393 B2 * | 1/2012 | Nettleton | ..... | G01S 7/003 342/175 |
| 8,280,430 B2 * | 10/2012 | Naguib | ..... | H01Q 3/267 340/572.1 |
| 8,441,393 B2 * | 5/2013 | Strauch | ..... | G01S 7/006 342/118 |
| 2005/0209765 A1 | 9/2005 | Erhart et al. | | |
| 2005/0258955 A1 * | 11/2005 | Gloekler | ..... | G06Q 50/30 340/539.13 |
| 2011/0148691 A1 * | 6/2011 | Samaniego | ..... | G01S 13/003 342/25 F |
| 2012/0146833 A1 * | 6/2012 | Pawlitzki | ..... | G01S 7/003 342/37 |
| 2012/0195459 A1 * | 8/2012 | Schmidt | ..... | G01S 7/003 382/103 |
| 2012/0326889 A1 * | 12/2012 | Kabler | ..... | G01S 7/4806 340/905 |
| 2015/0226853 A1 | 8/2015 | Seo et al. | | |

FOREIGN PATENT DOCUMENTS

| | | |
|---|---|---|
| CN | 106353765 | 1/2017 |
| CN | 107682110 | 2/2018 |
| JP | H07-20232 A | 1/1995 |
| JP | 2005-518545 A | 6/2005 |
| JP | 2014-202587 A | 10/2014 |
| JP | 2015-194385 A | 11/2015 |

* cited by examiner

DATA TRANSMISSION METHOD, DEVICE AND RADAR APPARATUS

The present application is a U.S. national phase application of International Patent Application no. PCT/CN2018/077997, filed Mar. 5, 2018, which claims the priority to a Chinese Patent Application No. 201710129387.4, filed with the China National Intellectual Property Administration on Mar. 6, 2017 and entitled "DATA TRANSMISSION METHOD, DEVICE AND RADAR APPARATUS", which are incorporated into the present application by reference in their entirety.

TECHNICAL FIELD

The present application relates to the field of communication technologies, and in particular, to a data transmission method, apparatus, and radar device.

BACKGROUND

With the rapid development of control technology, radar device is increasingly used in device control. Specifically, the radar device acquires data such as the distance between the object within the measurement range and the center of the radar device, and then transmits the acquired data to the destination device. The destination device performs device control based on the received data.

The radar device generally acquire data in a rotation manner, and the data acquired by the device during the process of rotating by a maximum rotation angle from the target location forms one frame of data.

In the prior art, the radar device generally acquires one frame of data and then transmits the entire frame of data to the destination device. After receiving the data, the destination device performs device control in combination with the received data.

Although the device in the above manner can perform device control, the data received by the destination device is acquired by the radar device during the previous rotation period. When the data is transmitted in the above manner from the perspective of the destination device, there is a problem that the data delay is large.

SUMMARY OF THE INVENTION

The embodiment of the present application discloses a data transmission method, apparatus and radar device to reduce data delay.

In order to achieve the above objective, the embodiment of the present application discloses a data transmission method, which is applied in a radar device, and the method includes:

determining a starting data acquisition location as a target location;

obtaining data acquired by the radar device in rotating by a preset angle from the target location, wherein the preset angle is an angle within a range of (0°, $Max_A$), and $Max_A$ indicates a preset maximum rotation angle;

packetizing the acquired data to generate a target data packet; and transmitting the target data packet to the destination device.

In an implementation of the present application, obtaining data acquired by the radar device in rotating by a preset angle from the target location includes:

obtaining a measurement angle and a measurement distance acquired by the radar device at each of preset measurement points in rotating a preset angle from the target location, wherein a measurement angle acquired at a measurement point indicates an angle between the measurement point and a preset mechanical zero point, and a measurement distance acquired at a measurement point indicates a distance between an object within a preset measurement range and a center of the radar device;

packetizing the acquired data to generate a target data packet comprises:

determining a starting measurement angle and an ending measurement angle in the obtained measurement angles as a first angle and a second angle respectively;

packetizing the acquired data to generate a target data packet including the first angle, the second angle, and the obtained measurement distances.

In an implementation of the present application, packetizing the acquired data to generate a target data packet including the first angle, the second angle, and the obtained measurement distances includes:

determining a length of a data area, wherein the data area includes the first angle, the second angle, and the obtained measurement distances;

packetizing the acquired data to generate a target data packet including the length, the first angle, the second angle, and the obtained measurement distances.

In an implementation of the application, the data transmission method further includes:

obtaining a rotation speed of the radar device;

the data area further includes the rotation speed;

wherein packetizing the acquired data to generate a target data packet including the length, the first angle, the second angle, and the obtained measurement distances comprises:

packetizing the acquired data in combination with the rotation speed to generate a target data packet including the length, the first angle, the second angle, the obtained measurement distances and the rotation speed.

In an implementation of the present application, packetizing the acquired data in combination with the rotation speed to generate a target data packet including the length, the first angle, the second angle, the obtained measurement distances and the rotation speed includes:

obtaining a packet header;

generating a check code according to the packet header, the length, the first angle, the second angle, the obtained measurement distances, and the rotation speed;

generating a target data packet including the packet header, the length, the first angle, the second angle, the obtained measurement distances, the rotation speed, and the check code.

In an implementation of the present application, after obtaining measurement angles and measurement distances acquired by the radar device at each of preset measurement points in rotating by a preset angle from the target location, the method further includes:

for each of the obtained measurement distances, when the measurement distance is less than a first preset distance, setting a measurement distance to a first preset value, and when a measurement distance is greater than a second preset distance, setting the measurement distance to a second preset value, wherein the first preset distance is less than the second preset distance.

In an implementation of the present application, the preset angle=$Max_A/N$, where N is a positive integer.

In an implementation of the application, determining a starting data acquisition location includes:

determining a location corresponding to a third angle as the starting data acquisition location, wherein the third angle is an ending measurement angle included in a data packet transmitted to the destination device last time.

In an implementation of the present application, after obtaining data acquired by the radar device in rotating by a preset angle from the target location, the method further includes:

re-determining the target location and performing the step of obtaining data acquired by the radar device in rotating by a preset angle from the target location in parallel with the step of packetizing the acquired data to generate a target data packet.

In an implementation of the application, the step of transmitting the target data packet to the destination device includes:

transmitting the target data packet to the destination device via a preset serial port.

In order to achieve the above objective, the embodiment of the present application discloses a data transmission apparatus, which is applied in a radar device, and the apparatus includes:

a location determination module, configured for determining a starting data acquisition location as a target location;

an obtaining data module, configured for obtaining data acquired by the radar device in rotating by a preset angle from the target location, wherein the preset angle is an angle within a range of (0°, $Max_A$), and $Max_A$ indicates a preset maximum rotation angle;

a packet generation module, configured for packetizing the acquired data to generate a target data packet; and a transmitting packet module, configured for transmitting the target data packet to the destination device.

In an implementation of the present application, the obtaining data module is configured for obtaining a measurement angle and a measurement distance acquired by the radar device at each of preset measurement points in rotating by a preset angle from the target location, wherein a measurement angle acquired at a measurement point indicates an angle between the measurement point and a preset mechanical zero point, and a measurement distance acquired at a measurement point indicates a distance between an object within a preset measurement range and a center of the radar device;

the packet generation module comprises:

an angle determination unit, configured for determining a starting measurement angle and an ending measurement angle in the obtained measurement angles as a first angle and a second angle respectively;

a packet generation unit, configured for packetizing the acquired data to generate a target data packet including the first angle, the second angle, and the obtained measurement distances.

In an implementation of the application, the packet generation unit includes:

a length determination subunit, configured for determining a length of a data area, wherein the data area comprises the first angle, the second angle, and the obtained measurement distances;

a packet generation subunit, configured for packetizing the acquired data to generate a target data packet including the length, the first angle, the second angle, and the obtained measurement distances.

In an implementation of the application, the data transmission apparatus further includes:

a rotation speed obtaining module, configured for obtaining a rotation speed of the radar device;

the data area further includes the rotation speed;

the packet generation subunit is configured for packetizing the acquired data in combination with the rotation speed to generate a target data packet including the length, the first angle, the second angle, the obtained measurement distances and the rotation speed.

In an implementation of the application, the packet generation subunit is specifically configured for obtaining a packet header, generating a check code according to the packet header, the length, the first angle, the second angle, the obtained measurement distances, and the rotation speed and generating a target data packet including the packet header, the length, the first angle, the second angle, the obtained measurement distances, the rotation speed, and the check code.

In an implementation of the application, the data transmission apparatus further includes:

a distance setting module, configured for, after the obtaining data module obtains the measurement distance, for each of the obtained measurement distances, when the measurement distance is less than a first preset distance, setting a measurement distance to a first preset value, and when a measurement distance is greater than a second preset distance, setting the measurement distance to a second preset value, wherein the first preset distance is less than the second preset distance.

In an implementation of the application, the preset angle=Max/N, where N is a positive integer.

In an implementation of the application, the location determination module is specifically configured for determining a location corresponding to the third angle as a starting data acquisition location, which is determined as the target location, wherein the third angle is an ending measurement angle included in a data packet transmitted to the destination device last time.

In an implementation of the application, the obtaining data module is further configured for triggering, in a parallel manner, the packet generating module to generate the target data packet and the location determination module to re-determine the target location.

In an implementation of the application, the transmitting packet module is specifically configured for transmitting the target data packet to the destination device via a preset serial port.

In order to achieve the above object, an embodiment of the present application discloses a radar device. The radar device includes a housing, a processor, a memory, a circuit board and a power supply circuit, wherein the circuit board is arranged inside a space enclosed by the housing, the processor and the memory are arranged on the circuit board; the power supply circuit is used to supply power for various circuits or components of the radar device; the memory is used to store executable program codes; and the processor executes a program corresponding to the executable program codes by reading the executable program codes stored on the memory to implement the data transmission method provided by the embodiment of the present application.

In order to achieve the above objective, an embodiment of the present application discloses an application for executing the data transmission method provided by the embodiment of the application at run time.

In order to achieve the above objective, the embodiment of the present application discloses a computer readable storage medium, where the computer readable storage medium stores a computer program, and the computer program is executed by the processor to implement the data transmission method provided by the embodiment of the present application.

As mentioned above, in the solution provided by the embodiment of the present application, each time the target data packet transmitted to the destination device is generated according to the data acquired by the radar device during the process of rotating by the preset angle from the target location. The preset angle is smaller than the maximum rotation angle of the radar device, so when the destination device receives the target data packet, compared with the prior art, the data delay is smaller than the case where the complete frame data is acquired, and therefore, the delay can be reduced.

BRIEF DESCRIPTION OF THE DRAWINGS

In order to more clearly describe the technical solutions in embodiments of the present application, accompanying drawings that is used in embodiments will be briefly described below. Obviously, accompanying drawings described below are for only some of embodiments of the present application; those skilled in the art may also obtain other accompanying drawings based on these accompanying drawings without any creative efforts.

DETAILED DESCRIPTION OF THE INVENTION

In order to make the objects, technical solutions, and advantages of the present application more comprehensible, the present application will be further described in detail below with reference to the accompanying drawings. It is apparent that the described embodiments are only a part of the embodiments of the present application, and not all of them. All other embodiments obtained by a person of ordinary skill in the art based on the embodiments of the present application without any creative effort fall within the protection scope of the present application.

To solve the problems in the prior art, embodiments of the present application provide a data transmission method, apparatus, and radar device, wherein the data transmission method and apparatus are applied in a radar device.

Specifically, the radar device may be a laser radar device, or may be other types of radar devices, such as a sonar radar, etc., which is not limited in this application.

The radar device can acquire data in a rotation manner. That is, the radar device can acquire data acquisition by rotating.

The concepts involved in the working mode of radar device will be introduced below.

A maximum rotation angle can be understood as the maximum angle by which a radar device can rotate from a certain location, which is a relative angle. In addition, the maximum rotation angle of the radar device can be set according to a specific application.

For example, if a radar device can rotate 360° from its mechanical zero point, the maximum rotation angle thereof is: 360°−0°=360°.

If a radar device is capable of rotating from a certain location with 30° away from its mechanical zero point to a location with 270° away from its mechanical zero point, the maximum rotation angle is: 270°−30°=240°.

It should be understood that the above description is only illustrative, to which the present application is not limited.

The data transmission method, apparatus and radar device provided by the present application will be described in detail below through specific embodiments.

Figure 1:
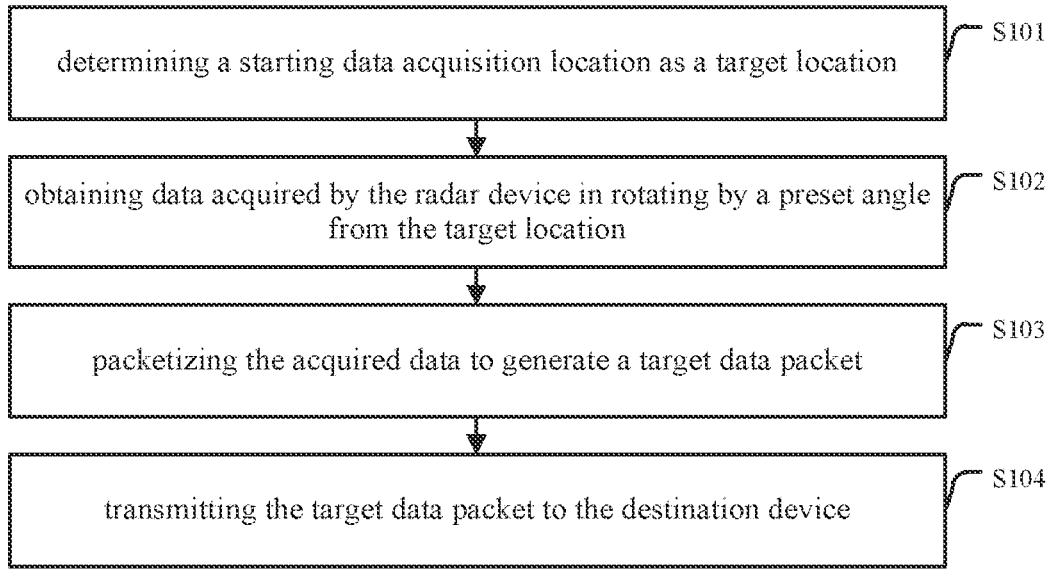
FIG. 1 is a schematic flowchart of a data transmission method according to an embodiment of the present application.

FIG. 1 is a schematic flowchart diagram of a data transmission method according to an embodiment of the present application, wherein the method is applied in a radar device.

Specifically, the data transmission method includes:

S101: determining a starting data acquisition location as a target location.

Since the radar device can acquire data in a rotation manner, and the radar device generally has a preset mechanical zero point, the target location can be expressed by an angle between the target location and the mechanical zero point.

S102: obtaining data acquired by the radar device in rotating by a preset angle from the target location.

It can be understood that, when the radar device acquires data in a rotation manner, a certain number of acquisition points may be set in advance for the radar device, and when the radar device rotates to each of the acquisition points, data is acquired at that acquisition point. The data acquired by the radar device at each of the acquisition points may include an angle between the acquisition point and the mechanical zero point, a distance between an object within the measurement range and the center of the radar device, and the like.

The above measurement range varies depending on the type of radar device. For example, some laser radar device may have a measurement range of 0 to 10 meters and so on. The radar device generally has a high measurement accuracy, and the above-mentioned distances acquired can reach a millimeter level.

Specifically, the acquisition points are distributed along a rotation range, and the acquisition points may be uniformly or non-uniformly distributed in the rotation range, which is not limited in the application. The above rotation range may be understood as an area over which the radar device can rotate.

Assuming that a rotation range of a radar device is [0°, 360°), in which each of the values involved can be understood as an angle relative to the mechanical zero of the radar device, the sampling points can be set respectively at every integer angle from the mechanical zero point, that is, 0°, 1°, 2°, 3°, 4°, 5° . . . , which would be a total of 360 sampling points.

In the present application, the preset angle is an angle within a range of (0°, $Max_A$), and $Max_A$ represents a preset maximum rotation angle, for example, $Max_A$ may be 360°, 270°, or the like. The preset angle can be an angle in integer form, for example, 18°, 36°, etc., and may also be an angle in decimal form, for example, 18.5°, 20.5°, and the like.

In addition, the above preset angle may also satisfy the following conditions:

Preset angle=$Max_A/N$, wherein $N$ is a positive integer.

Since the preset angle is smaller than the preset maximum rotation angle, the data acquired in this step is only a part of one frame of data acquired by the radar device. Further, the N is a positive integer, so that the data acquired by the radar device during a process of rotating sequentially by the N preset angles can form one frame of data, which is beneficial for the destination device to determine one frame of data according to the data acquired by the radar device for device control.

S103: packetizing the acquired data to generate a target data packet.

The data is packetized to generate data in a form of a "packet", which may be called as a data packet.

Specifically the above packet process is affected by factors such as a communication protocol that the data transmission process needs to comply with, and will not be described in detail herein.

S104: transmitting the target data packet to the destination device.

Optionally, the target data packet may be transmitted to the destination device via a preset serial port.

The serial port is the abbreviation of serial interface, and is also called as serial transmission interface or serial communication interface (for example, COM interface), which is an extended interface adopting serial transmission mode.

Of course, the target data packet may also be transmitted to the destination device via other types of interfaces, for example, IIC (Inter-Integrated Circuit), SPI (Serial Peripheral Interface), etc. which is not limited in this application.

Since the destination device is controlled according to the information related to the distance acquired by the radar device and so on, the more the distance acquired by radar device approximates the distance between the detected object and the destination device, the better the precise control is achieved. Therefore, the radar device may be mounted on the surface of the destination device, or mounted in the cavity of the destination device, etc. Specifically, the above-mentioned destination device may be a robot, and in this case, the radar device may also be referred to as a positioning module of the robot.

In the case of a robot, after receiving the data packet transmitted by the radar device via the preset serial port, the data packet is analyzed to obtain the information such as the angle, the distance and the like, and then an image for the surrounding environment of the robot can be constructed according to the information, and then the robot motion is controlled based on the constructed image.

It can be understood by those skilled in the art that the radar device may be rotated continuously, and the generating of the target data packet will take some time. In order to avoid the generating of the target data packet from delaying the obtaining of the data acquired by the radar device during the subsequent rotation, in an optional implementation of the present application, after obtaining the data acquired by the radar device during the process of rotating by a preset angle from the target location, the above target location is redetermined and the step of obtaining data acquired by the radar device in rotating by a preset angle from the target location is performed (S102) in parallel with the step of packetizing the acquired data to generate the target data packet. In this way, while the target data packet is generated, the data acquired by the radar device may still be obtained.

For example, a thread 1 may be used to obtain the data acquired by the radar device, and a thread 2 may be used to perform the packet process to generate the data packet. After the thread 1 obtains the data acquired by the radar device in rotating by a preset angle again, the data is transmitted to the thread 2 for the packet process, and thread 1 continues to obtain the data acquired during the subsequent rotation.

Certainly, the present application only describes the parallel mode by taking the above as an example. In practical applications, factors such as resource consumption required for data transmission between threads are considered, and the specific implementation manner is not limited to the above.

It should be noted that, since the preset angle mentioned above is an angle in a range of $(0°, Max_A)$, the data packet transmitted each time to the destination device in S104 is only a part of one frame of the data acquired by the radar device. Therefore, transmitting one frame of the data to the destination device needs to be implemented by one or more of the above data transmission processes. In addition, the target location mentioned in S101 is only a starting acquisition location corresponding to a process of transmitting the data packet to the destination device once as mentioned above.

Based on the above situation, in an optional implementation of the present application, in determining a starting data acquisition location in S101, a starting data acquisition location may be determined according to a fixed rotation angle interval as the target location.

In another optional implementation of the present application, in determining a starting data acquisition location in S101, an acquisition point corresponding to the data packet that is transmitted to the destination device last time may be determined as the starting data acquisition location, that is, the target location.

As mentioned above, in the solution provided by this embodiment, each of the target data packets transmitted to the destination device is generated according to the data acquired by the radar device in rotating by a preset angle from the target location. Since the preset angle is smaller than the maximum rotation angle of the radar device, when the destination device receives a target data packet with a smaller delay than the case where a complete frame data is acquired in the prior art, and therefore, the delay can be reduced.

Figure 2:
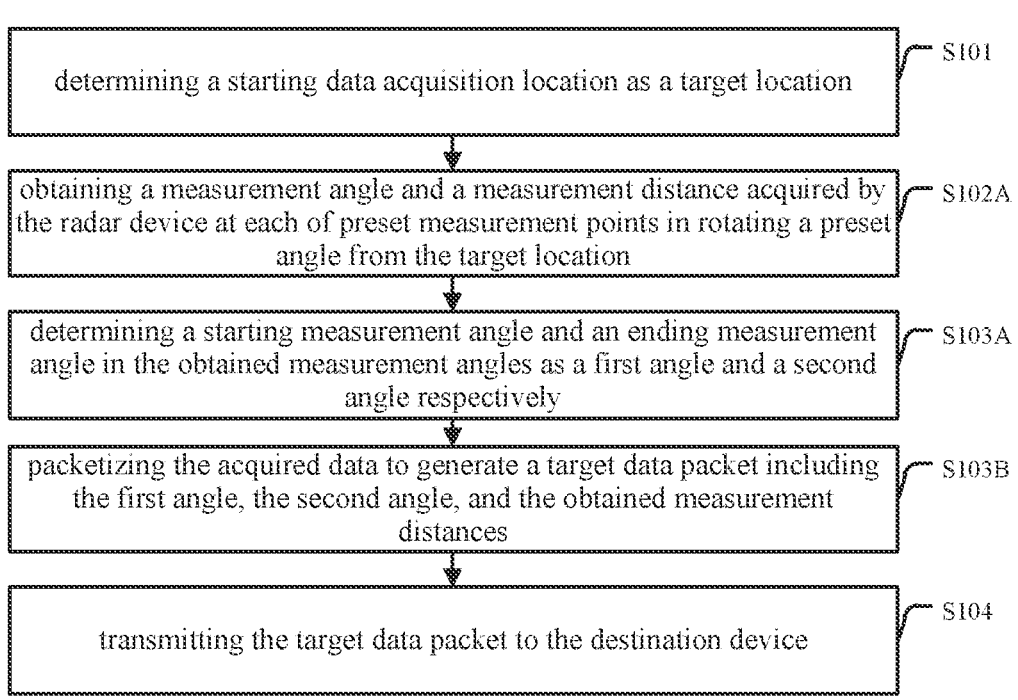
FIG. 2 is a schematic flowchart of another data transmission method according to an embodiment of the present application.

FIG. 2 is a schematic flowchart of another data transmission method according to an embodiment of the present application. Compared with the foregoing embodiment, in this embodiment, obtaining data acquired by the radar device in rotating by a preset angle from the target location comprises:

S102A: obtaining a measurement angle and a measurement distance acquired by the radar device at each of preset measurement points in rotating a preset angle from the target location.

A measurement angle acquired at a measurement point indicates an angle between the measurement point and a preset mechanical zero point, and a measurement distance acquired at a measurement point indicates a distance between an object within a preset measurement range and a center of the radar device.

Specifically, the foregoing measurement points may be set according to actual application requirements. For example, one acquisition point may be set per 10, or 20, which is not limited in this application.

Packetizing the acquired data to generate a target data packet includes:

S103A: determining a starting measurement angle and an ending measurement angle in the obtained measurement angles as a first angle and a second angle respectively.

Since the radar device can be rotated in clockwise direction and counterclockwise direction, in an implementation of the present application, the starting measurement angle and the ending measurement angle can be determined according to the obtained measurement angles, the preset angle, and the rotation direction.

For example, given that the preset angle is: 18°, and the radar device rotates clockwise, example 1: the obtained measurement angles are:

36°, 37°, 38°, 39°, 40° . . . 49°, 50°, 51°, 52°, 53°, according to the above measurement angles, the radar device is rotated clockwise by 17° from 36°, which involves 18 sampling points; corresponding to the preset angle, the starting measurement angle is: 360, and the ending measurement angle is: 53°;

example 2: the obtained measurement angles are:

350°, 351°, 352°, 353°, 354° . . . 2°, 3°, 4°, 5°, 6°, according to the above measurement angle, the radar device is rotated clockwise by 17° from 350°, which involves 18 sampling points; corresponding to the preset angle, the starting measurement angle is: 350°, and the ending measurement angle is: 6°.

S103B: packetizing the acquired data to generate a target data packet including the first angle, the second angle, and the obtained measurement distances.

Since a target data packet does not includes measurement angles corresponding to all sampling points, but only includes a starting measurement angle and a ending measurement angle, the amount of the data contained in a target data packet may be greatly reduced, thereby reducing the amount of data transmitted to the destination device. In addition, since a target data packet includes the obtained measurement distances, the destination device can still obtain the distance data acquired by the radar device at each sampling point, thereby ensuring the data precision of the data obtained by the destination device.

In addition, in order to ensure that the destination device can correspond each of the measurement distances with a sampling point after receiving the target data packets, that is, correspond each of the measurement distances with the direction of an object in the measurement range, in the case where the target data packet only includes the first angle and the second angle, the distribution of each of the sampling points over the rotation range can be defined in advance.

The embodiment will be described with comparing of data below, as shown in Table 1:

TABLE 1

| | The embodiments shown in FIG. 2 | Prior arts | Comparison results of the amount of the data |
|---|---|---|---|
| Measurement angle 1 | 36°, 37°, 38°, 39°, 40° . . . 49°, 50°, 51°, 52°, 53° | 36°, 37°, 38°, 39°, 40° . . . 49°, 50°, 51°, 52°, 53° | The same |
| Measurement distance 1 | 2000, 2000, 2000, 2000, 2000 . . . 2000, 2000, 2000, 2000, 2000 | 2000, 2000, 2000, 2000, 2000 . . . 2000, 2000, 2000, 2000, 2000 | The same |
| Measurement angle 2 | 36°, 53° | 36°, 37°, 38°, 39°, 40° . . . 49°, 50°, 51°, 52°, 53° | 2: 18 |
| Measurement distance 2 | 2000, 2000, 2000, 2000, 2000 . . . 2000, 2000, 2000, 2000, 2000 | 2000, 2000, 2000, 2000, 2000 . . . 2000, 2000, 2000, 2000, 2000 | The same |

The measurement angle 1 in the above table represents the measurement angle acquired by the radar device in rotating by a preset angle, the measurement distance 1 represents the measurement distance acquired by the radar device in rotating by a preset angle; the measurement angle 2 represents the measurement angle contained in the data packet transmitted to the destination device, and the measurement distance 2 represents the measurement distance contained in the data packet transmitted to the destination device. Each angle in the measurement angle 1 one-to-one corresponds with each distance in the measurement distance 1. The unit of the distance value in the table can be understood as millimeter.

By comparison, it can be seen that, with the solution provided by the embodiment shown in FIG. 2, the amount of the data of the measurement angle included in the data packet transmitted to the destination device is only ⅑ of that in the prior art.

In an implementation of the present application, when packetizing the acquired data to generate a target data packet including the first angle, the second angle, and the obtained measurement distances, the target data packet may further include the packet header information, which is used to identify the target data packet and may be information describing a type of the target data packet, or may be only a special character string. It can be seen from the foregoing description that the data information to be transmitted to the destination device in the embodiment of the present application can be understood as data acquired by the radar device, which includes a first angle, a second angle, and the obtained measurement distances, etc. Specifically, an area in which the above data information is stored may be referred to as a data area.

In an implementation of the present application, when packetizing the acquired data to generate a target data packet including the first angle, the second angle, and the obtained measurement distances, the length of the data area may be determined first, and then the acquired data is packetized to generate a target data packet including the first angle, the second angle, and the obtained measurement distances.

The data area in the implementation manner includes a first angle, a second angle, and the obtained measurement distances.

When the target data packet includes the length of the data area, the destination device can obtain the length of the data area only by analyzing the length after receiving the target data packet, without waiting for analyzing the entire target data packet. In addition, as technology advances, radar devices may require for acquiring more accurate data, which results in more data to be transmitted to the destination device and changing in the number of sampling points contained in one packet. In the case that the data packet contains the length of the data area, only the corresponding resource is allocated according to the length when the data packet is generated, such that the destination device only requires to allocate the corresponding resource according to the analyzed length when analyzing the data packet. It is beneficial to adjust the length of the data packet according to the actual situation, which enhances the robustness of the above data transmission method.

It can be understood that the radar device rotates continuously, of which the rotation may be indicated by a parameter of rotation speed. The rotation speed can be understood as the rotated arc per second, for example, the rotation speed of a laser radar may be: 8*360° per second, 9*360° per second, 10*360° per second, etc., that is, 8 cycles per second, 9 cycles per second, 10 cycles per second, etc.

In an implementation of the application, the foregoing data transmission method may further include:

obtaining a rotation speed of the radar device.

In this case, the above data area may include the above rotation speed.

Packetizing the acquired data to generate a target data packet including the length, the first angle, the second angle, and the obtained measurement distances may comprise packetizing the acquired data in combination with the rotation speed to generate a target data packet including the length, the first angle, the second angle, the obtained measurement distances and the rotation speed.

There may be a transmission error during data transfer, which results in error in the data received by the destination device, such that the image constructed by the destination device for the environment surrounding the robot may be distorted. However, the destination device generally has a small motion within one second, so that there is a strong time correlation between the frames of data acquired by the radar device. Therefore, the destination device can determine the subsequently received frames of data according to the above-mentioned rotation speed, for correcting the constructed image for the environment surrounding the robot in order to obtain better control effects and reduce the impact of transmission errors or data acquisition errors on the device controlling.

To further ensure that the destination device is able to use the correct data for device controlling, packetizing the acquired data in combination with the rotation speed to generate a target data packet including the length, the first angle, the second angle, the obtained measurement distances and the rotation speed may comprise obtaining a packet header; generating a check code according to the packet header, the length, the first angle, the second angle, the obtained measurement distances, and the rotation speed; and generating a target data packet including the packet header, the length, the first angle, the second angle, the obtained measurement distances, the rotation speed, and the check code.

The check code may be a CRC (Cyclic Redundancy Check) check code, such as a CRC8 check code. In this way, after receiving the target data packet, the destination device may first verify whether a transmission error has occurred according to the check code, and then use the data contained in the target data packet to perform device control.

It should be noted that the foregoing data area does not include a check code. In addition, after receiving the target data packet, since the destination device requires to check whether the data transmission error occurs during the process of transmitting the target data packet based on the check code contained in the target data packet, it can determine whether the data in the target data packet is available only after analyzing the check code and performing data verification. It is known from the foregoing description that the target data packet contains the length of the data area, so that after parsing the length of the data area from the target data packet, the destination device can directly obtain the check code according to the above length and the preset arrangement format of the data in the target data packet in the case where the parsing of all data in the data area is not completed, and then parse the check code. This may greatly improve the data process speed of the destination device.

In general, a radar device has a limited measurement range due to its own characteristics. In view of this, in one implementation, after obtaining the measurement distance acquired by the radar device at each of the preset measurement points in rotating by a preset angle from the target location, the obtained measurement distances may also be adjusted.

Specifically, for each of the obtained measurement distances, when the measurement distance is less than a first preset distance, a measurement distance is set to a first preset value, and when a measurement distance is greater than a second preset distance, the measurement distance is set to a second preset value, wherein the first preset distance is less than the second preset distance.

That is to say, the above setting operation is performed for each of the obtained measurement distances.

A small measurement distance indicates that the radar device is close to the object. At this time, without controlling in time, the destination device may easily collide with the object, which is deemed as entering a measurement blind zone. In this case, the measurement distance may be adjusted to a smaller value so that the destination device may quickly adjust its motion according to the adjusted distance.

In addition, when the distance between the object and the radar device is relatively long, where the destination device does not easily collide with the object, the motion state of the destination device may not be changed, and the data acquired in this case may be ignored.

For example, the first preset distance may be 10 cm, the first preset value may be 0x00; the second preset distance may be 10 meters, and the second preset value may be 0xFF.

In an implementation of the present application, the preset angle=$Max_A/N$, where N is a positive integer.

In addition, when determining a starting data acquisition location, a location corresponding to a third angle may be determined as the starting data acquisition location, wherein the third angle is an ending measurement angle included in a data packet transmitted to the destination device last time.

It should be mentioned that, in the case that the above target location corresponds to one sampling point, the data obtained in S102 may include the data acquired at the target location, and the data acquired at the target location is not included in the last data packet transmitted to the destination device; or, the data acquired in S102 does not include the data acquired at the above-mentioned target location, and the last data packet transmitted to the destination device contains the data acquired at the target location. Regardless of which of the above methods is adopted, it can be ensured that the data acquired by the radar device at each sampling point is not repeatedly transmitted to the destination device, thereby, to a certain extent, it is ensured that data transmission is performed with high precision, and the amount of data transmitted is small.

For example: assuming N=30, the preset angle is 12°.

0°, 1°, 2°, 3°, 4°, 5°, 6°, 7°, 8°, 9°, 10°, 11°, 12° respectively correspond to one sampling point, the foregoing target location corresponds to 0°, and the radar device rotates by 12° from 0°.

In one case, the data obtained in S102 is data acquired at 0°, 1°, 2°, 3°, 4°, 5°, 6°, 7°, 8°, 9°, 10°, 11°. In this case, after the radar device is rotated to 11°, the above data acquisition may be completed.

In another case, the data obtained in S102 is data acquired at 1°, 2°, 3°, 4°, 5°, 6°, 7°, 8°, 9°, 10°, 11°, 12°.

It can be seen from the above that, in the solution provided by the foregoing embodiments, the data packet transmitted to the destination device only includes the starting measurement angle and the ending measurement angle in terms of the measurement angle, and the accuracy of the device obtained by the destination device is ensured. It can effectively reduce the amount of data in the data packet, thereby reducing the bandwidth requirement during data transmission.

In addition, since the data packet sent by the radar device to the destination device is smaller than that of the prior art, when the data is transmitted by using the solution provided by the embodiment of the present application, the need for bandwidth is reduced as compared with the prior art.

The inventor has found that nearly half of the bandwidth resources can be saved when the data transmission is implemented by using the solution provided by the embodiment of the present application as compared with the prior art. This is illustrated by a specific example:

Assuming that the maximum rotation angle of the radar device is 360°, that is, it can rotate by a full circle, and 360 sampling points are set on one circle. The preset angle is 12°, that is, one data packet corresponds to 12 sampling points, and the radar device rotates by one circle to acquire data corresponding to 30 data packets, and the radar device rotates 8 circles per second.

The data in each packet and the number of bytes occupied by each data are as follows:

Packet header: 1 Byte; length of data area: 2 Bytes; rotation speed: 2 Bytes; starting measurement angle: 2 Bytes; measurement distance: 2*12 Bytes; ending measurement angle: 2 Bytes; check code: 1 Byte.

The number of bytes corresponding to such a data packet is: 34 Bytes, and the amount of data transmitted by the radar device to the destination device per second is: 34 Byte*8*30=8160 Byte=65280 bits. That is, when the data is transmitted by applying the embodiment of the present application, the required bandwidth is: 65280 bit/s.

The bandwidth required for data transmission in the prior art is usually 115200 bit/s. It can be seen that the bandwidth required for transmitting data in the embodiment of the present application is only 65,080/115200*100%=56.6% of the bandwidth required by the prior art.

Further, since the bandwidth resources required for the radar device in transmitting data to the destination device are reduced, in the case where the bandwidth resource is limited, more data can be transmitted by using the solution provided by the embodiment of the present application, so that the radar device can transmit high-precision data to the destination device without data discarding. Such a destination device may also receive high-precision data, which in turn facilitate efficient and accurate device control.

Further, in the solution provided by the embodiment of the present application, the data packet transmitted by the radar device to the destination device corresponds to a certain angle, that is, corresponds to one sector. When the destination device receives the data packet and constructs an image for the environment surrounding the destination device by splicing the received data packet one by one in an order they are received. Therefore, the solution provided by the embodiment of the present application for data transmission can provide convenience for the destination device to construct an image.

The data transmission method provided by the embodiment of the present application is described in more detail below by taking a robot as an example.

In an example, the radar device is laser radar device, the destination device is a robot, the maximum rotation angle of the laser radar device is 360°, one sampling point is set per 1° in a range of [0°, 36°), and the angle corresponding to each sampling point is an integer, that is, the angles corresponding to the sampling points are: 0°, 1°, 2°, 3°, 4°, 5°, . . . 359°, for a total of 360 sampling points; the preset angle is 12°, so that the entire rotation range of the laser radar may be divided into 30 sectors.

In an example that the above target location corresponds to 0°, in a process of the laser radar device rotating by 11° from the location corresponding to 0°, the laser radar device acquires 12 measurement angles and 12 corresponding measurement distances; calculates the length of a data area including the starting measurement angle 0°, the ending measurement angle 11° and the 12 measurement distances; generates a packet header according to the starting measurement angle 0°, the ending measurement angle 11°, the 12 measurement distances, the rotation speed and the length mentioned above; generates a check code corresponding to the packet header, the starting measurement angle 0°, the ending measurement angle 11°, the 12 measurement distances, the rotation speed and the length; combines the packet header, the starting measurement angle 0°, the ending measurement angle 11°, the 12 measurement distances, the rotation speed, the length and check code in a certain format to generate a target data packet; and transmits the target data packet to the destination device via a preset serial port.

The arrangement format of the above various data in the target data packet may be as shown in Table 2 below:

TABLE 2

| Header | Length | Rotation speed | Starting measurement angle | 12 Measurement distances | Ending measurement angle | Check code |
| --- | --- | --- | --- | --- | --- | --- |
| 1 Byte | 2 Byte | 2 Byte | 2 Byte | 12*2 Byte | 2 Byte | 1 Byte |

Of course, the present application is merely described as an example, and the arrangement format of various data in the data packet is not limited thereto.

Corresponding to the above data transmission method, the embodiment of the present application further provides a data transmission device.

Figure 3:
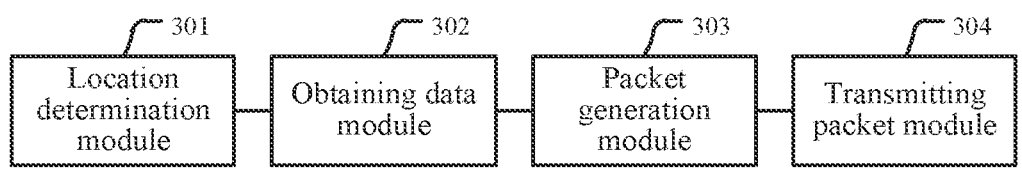
FIG. 3 is a schematic structural diagram of a data transmission apparatus according to an embodiment of the present application.

FIG. 3 is a schematic structural diagram of a data transmission apparatus according to an embodiment of the present application. The apparatus is applied to a radar device, and includes:

a location determination module 301, configured for determining a starting data acquisition location as a target location;

an obtaining data module 302, configured for obtaining data acquired by the radar device in rotating by a preset angle from the target location, wherein the preset angle is an angle within a range of (0°, $Max_A$), and $Max_A$ indicates a preset maximum rotation angle;

a packet generation module 303, configured for packetizing the acquired data to generate a target data packet; and a transmitting packet module 304, configured for transmitting the target data packet to the destination device.

Specifically, the obtaining data module 302 may be specifically configured for obtaining a measurement angle and a measurement distance acquired by the radar device at each of preset measurement points in rotating by a preset angle from the target location, wherein a measurement angle acquired at a measurement point indicates an angle between the measurement point and a preset mechanical zero point, and a measurement distance acquired at a measurement point indicates a distance between an object within a preset measurement range and a center of the radar device.

The packet generation module 303 may include:

an angle determination unit, configured for determining a starting measurement angle and an ending measurement angle in the obtained measurement angles as a first angle and a second angle respectively;

a packet generation unit, configured for packetizing the acquired data to generate a target data packet including the first angle, the second angle, and the obtained measurement distances.

Specifically, the packet generating unit may include:

a length determination subunit, configured for determining a length of a data area, wherein the data area comprises the first angle, the second angle, and the obtained measurement distances;

a packet generation subunit, configured for packetizing the acquired data to generate a target data packet including the length, the first angle, the second angle, and the obtained measurement distances.

Specifically, the foregoing data transmission apparatus may further include:

a rotation speed obtaining module, configured for obtaining a rotation speed of the radar device.

The data area further includes: the rotation speed;

The packet generation subunit is specifically configured for packetizing the acquired data in combination with the rotation speed to generate a target data packet including the length, the first angle, the second angle, the obtained measurement distances and the rotation speed.

Specifically, the packet generation subunit may be specifically configured for obtaining a packet header, generating a check code according to the packet header, the length, the first angle, the second angle, the obtained measurement distances, and the rotation speed and generating a target data packet including the packet header, the length, the first angle, the second angle, the obtained measurement distances, the rotation speed, and the check code.

Specifically, the foregoing data transmission apparatus may further include:

a distance setting module, configured for, after the obtaining data module obtains the measurement distance, for each of the obtained measurement distances, when the measurement distance is less than a first preset distance, setting a measurement distance to a first preset value, and when a measurement distance is greater than a second preset distance, setting the measurement distance to a second preset value, wherein the first preset distance is less than the second preset distance.

Specifically, the preset angle=$Max_A/N$, where N is a positive integer.

Specifically, the location determination module 301 is specifically configured for determining a location corresponding to the third angle as a starting data acquisition location, which is determined as the target location, wherein the third angle is an ending measurement angle included in a data packet transmitted to the destination device last time.

Specifically, the obtaining data module 302 is further configured for triggerring, in a parallel manner, the packet generating module to generate the target data packet and the location determination module to re-determine the target location.

Specifically, the transmitting packet module 304 may be specifically configured for transmitting the target data packet to the destination device via a preset serial port.

As mentioned above, in the solution provided by the above various embodiments, each time the target data packet transmitted to the destination device is generated according to the data acquired by the radar device during the process of rotating by a preset angle. The preset angle is smaller than the maximum rotation angle of the radar device, so when the destination device receives the target data packet, compared with the prior art, the data delay is smaller than the case where the complete frame data is acquired, and therefore, the delay can be reduced.

Corresponding to the above data transmission method and device, the embodiment of the present application further provides a radar device.

Figure 4:
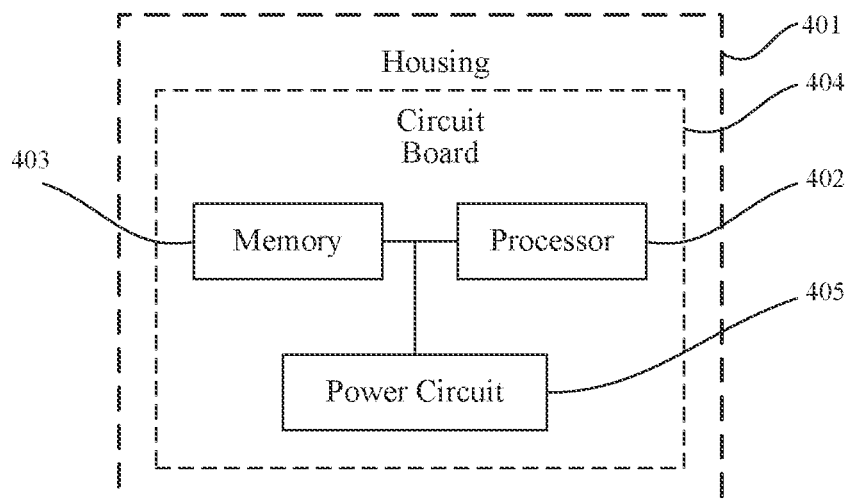
FIG. 4 is a schematic structural diagram of a radar device according to an embodiment of the present application.

FIG. 4 is a schematic structural diagram of a radar device according to an embodiment of the present application. The radar device includes a housing 401, a processor 402, a memory 403, a circuit board 404, and a power circuit 405. The circuit board 404 is disposed inside the space enclosed by the housing 401, and the processor 402 and the memory 403 are disposed on the circuit board 404; The power circuit 405 is configured to power various circuits or components of the radar device; The memory 403 is configured to store executable program code; The processor 402 runs a program corresponding to the executable program code by reading the executable program code stored in the memory 403 to implement the data transmission method provided by the embodiment of the present application.

Specifically, the foregoing data transmission method includes:

determining a starting data acquisition location as a target location;

obtaining data acquired by the radar device in rotating by a preset angle from the target location, wherein the preset angle is an angle within a range of (0°, $Max_A$), and $Max_A$ indicates a preset maximum rotation angle;

packetizing the acquired data to generate a target data packet; and transmitting the target data packet to the destination device.

Other embodiments corresponding to the data transmission method described above may be referred to the data transmission method section described above, which will not be repeated here.

The specific execution process of the above steps by processor 402 and the further execution steps by processor 402 by running executable program code can be referred to in the description of the embodiments shown in FIGS. 1-3 of this application, which will not be repeated here.

As mentioned above, in the solution provided by this embodiment, each time the target data packet transmitted to the destination device is generated according to the data acquired by the radar device during the process of rotating by a preset angle from the target location. The preset angle is smaller than the maximum rotation angle of the radar device, so when the destination device receives the target data packet, compared with the prior art, the data delay is smaller than the case where the complete frame data is acquired, and therefore, the delay can be reduced.

The embodiment of the application also provides an application for executing the data transmission method provided by the embodiment of the application at run time.

Specifically, the foregoing data transmission method includes:

determining a starting data acquisition location as a target location;

obtaining data acquired by the radar device in rotating by a preset angle from the target location, wherein the preset angle is an angle within a range of (0°, $Max_A$), and $Max_A$ indicates a preset maximum rotation angle;

packetizing the acquired data to generate a target data packet; and transmitting the target data packet to the destination device.

Other embodiments corresponding to the data transmission method described above may be referred to the data transmission method section described above, which will not be repeated here.

As mentioned above, in the solution provided by this embodiment, by running the above application, each time the target data packet transmitted to the destination device is generated according to the data acquired by the radar device during the process of rotating by a preset angle from the target location. The preset angle is smaller than the maximum rotation angle of the radar device, so when the destination device receives the target data packet, compared with the prior art, the data delay is smaller than the case where the complete frame data is acquired, and therefore, the delay can be reduced.

The embodiment of the present application further provides a computer readable storage medium, where the computer readable storage medium stores a computer program, and when the computer program is executed by the processor, the data transmission method provided by the embodiment of the present application is implemented.

Specifically, the foregoing data transmission method includes:

determining a starting data acquisition location as a target location;

obtaining data acquired by the radar device in rotating by a preset angle from the target location, wherein the preset angle is an angle within a range of (0°, $\text{Max}_A$), and $\text{Max}_A$ indicates a preset maximum rotation angle;

packetizing the acquired data to generate a target data packet; and transmitting the target data packet to the destination device.

Other embodiments corresponding to the data transmission method described above may be referred to the data transmission method section described above, which will not be repeated here.

As mentioned above, in the solution provided by this embodiment, by running a computer program stored in the computer readable storage medium described above, each time the target data packet transmitted to the destination device is generated according to the data acquired by the radar device during the process of rotating by a preset angle from the target location. The preset angle is smaller than the maximum rotation angle of the radar device, so when the destination device receives the target data packet, compared with the prior art, the data delay is smaller than the case where the complete frame data is acquired, and therefore, the delay can be reduced.

For the apparatus, the radar device, the application, and the computer readable storage medium embodiment, since they are similar to the embodiments of the method, the description thereof is relatively simple; the relating parts could refer to the parts of the description of embodiments of the method.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

It will be understood by those of ordinary skill in the art that all or some of the steps in the methods described above may be accomplished by a program to instruct the associated hardware. Said program may be stored in a computer-readable storage medium, such as ROMs/RAMs, magnetic disks, optical disks, etc.

The above is only the preferred embodiment of the present application, and is not intended to limit the present application. Any modifications, equivalent, improvement or the like within the spirit and principle of the present application should be included in the scope of the present application.

The invention claimed is:

1. A data transmission method, comprising:
   determining a starting data acquisition location as a target location;
   obtaining a measurement angle and a measurement distance acquired by the radar device at each of preset measurement points in rotating a preset angle from the target location, wherein the preset angle is an angle within a range of (0°, $\text{Max}_A$), $\text{Max}_A$ indicates a preset maximum rotation angle, the measurement points are distributed along a rotation range, and wherein a measurement angle acquired at each of the measurement points indicates an angle between the measurement point and a preset mechanical zero point, and a measurement distance acquired at each of the measurement points indicates a distance between an object within a preset measurement range and a center of the radar device;
   determining a starting measurement angle and an ending measurement angle in the obtained measurement angles as a first angle and a second angle respectively;
   packetizing the acquired data to generate a target data packet including the first angle, the second angle, and the obtained measurement distances; and
   transmitting the target data packet to a destination device.

2. The method of claim 1, wherein, packetizing the acquired data to generate a target data packet including the first angle, the second angle, and the obtained measurement distances comprises:
   determining a length of a data area, wherein the data area includes the first angle, the second angle, and the obtained measurement distances;
   packetizing the acquired data to generate a target data packet including the length, the first angle, the second angle, and the obtained measurement distances.

3. The method of claim 2, wherein, the method further comprises:
   obtaining a rotation speed of the radar device;
   the data area further includes the rotation speed;
   wherein packetizing the acquired data to generate a target data packet including the length, the first angle, the second angle, and the obtained measurement distances comprises:
   packetizing the acquired data in combination with the rotation speed to generate a target data packet including the length, the first angle, the second angle, the obtained measurement distances and the rotation speed.

4. The method of claim 3, wherein, packetizing the acquired data in combination with the rotation speed to generate a target data packet including the length, the first angle, the second angle, the obtained measurement distances and the rotation speed comprises:
- obtaining a packet header;
- generating a check code according to the packet header, the length, the first angle, the second angle, the obtained measurement distances, and the rotation speed;
- generating a target data packet including the packet header, the length, the first angle, the second angle, the obtained measurement distances, the rotation speed, and the check code.

5. The method of claim 1, wherein,
after obtaining measurement angles and measurement distances acquired by the radar device at each of preset measurement points in rotating by a preset angle from the target location, the method further comprises:
for each of the obtained measurement distances, when the measurement distance is less than a first preset distance, setting the measurement distance to a first preset value, and when the measurement distance is greater than a second preset distance, setting the measurement distance to a second preset value, wherein the first preset distance is less than the second preset distance.

6. The method of claim 1, wherein,
the preset angle=$Max_A/N$, wherein N is a positive integer.

7. The method of claim 6, wherein, determining a starting data acquisition location as a target location comprises:
determining a location corresponding to a third angle as the starting data acquisition location, wherein the third angle is an ending measurement angle included in a data packet transmitted to the destination device last time.

8. The method of claim 1, wherein, after obtaining a measurement angle and a measurement distance acquired by the radar device at each of preset measurement points in rotating a preset angle from the target location, the method further comprises:
re-determining the target location and performing the step of obtaining a measurement angle and a measurement distance acquired by the radar device at each of preset measurement points in rotating a preset angle from the target location in parallel with the step of packetizing the acquired data to generate a target data packet including the first angle, the second angle, and the obtained measurement distances.

9. The method of claim 1, wherein, transmitting the target data packet to the destination device comprises:
transmitting the target data packet to the destination device via a preset serial port.

10. A data transmission apparatus, which is applied in a radar device, comprising:
a location determination module, configured for determining a starting data acquisition location as a target location;
an obtaining data module, configured for obtaining a measurement angle and a measurement distance acquired by the radar device at each of preset measurement points in rotating a preset angle from the target location, wherein the preset angle is an angle within a range of (0°, $Max_A$), and $Max_A$ indicates a preset maximum rotation angle, the measurement points are distributed along a rotation range, and wherein a measurement angle acquired at each of the measurement points indicates an angle between the measurement point and a preset mechanical zero point, and a measurement distance acquired at each of the measurement points indicates a distance between an object within a preset measurement range and a center of the radar device;
a packet generation module including an angle determination unit and a packet generation unit, wherein the angle determination unit is configured for determining a starting measurement angle and an ending measurement angle in the obtained measurement angles as a first angle and a second angle respectively, and the packet generation unit is configured for packetizing the acquired data to generate a target data packet including the first angle, the second angle, and the obtained measurement distances; and
a transmitting packet module, configured for transmitting the target data packet to a destination device.

11. The apparatus of claim 10, wherein the packet generation unit comprises:
a length determination subunit, configured for determining a length of a data area, wherein the data area comprises the first angle, the second angle, and the obtained measurement distances;
a packet generation subunit, configured for packetizing the acquired data to generate a target data packet including the length, the first angle, the second angle, and the obtained measurement distances.

12. A radar device, comprising: a housing, a processor, a memory, a circuit board and a power supply circuit, wherein the circuit board is arranged inside a space enclosed by the housing, the processor and the memory are arranged on the circuit board; the power supply circuit is used to supply power for various circuits or components of the radar device; the memory is used to store executable program codes; and the processor is configured to execute a program corresponding to the executable program codes by reading the executable program codes stored on the memory to perform the following steps:
determining a starting data acquisition location as a target location;
obtaining a measurement angle and a measurement distance acquired by the radar device at each of preset measurement points in rotating a preset angle from the target location, wherein the preset angle is an angle within a range of (0°, $Max_A$), $Max_A$ indicates a preset maximum rotation angle, the measurement points are distributed along a rotation range, and wherein a measurement angle acquired at each of the measurement points indicates an angle between the measurement point and a preset mechanical zero point, and a measurement distance acquired at each of the measurement points indicates a distance between an object within a preset measurement range and a center of the radar device;
determining a starting measurement angle and an ending measurement angle in the obtained measurement angles as a first angle and a second angle respectively;
packetizing the acquired data to generate a target data packet including the first angle, the second angle, and the obtained measurement distances; and
transmitting the target data packet to a destination device.

13. The radar device of claim 12, wherein, packetizing the acquired data to generate a target data packet including the first angle, the second angle, and the obtained measurement distances comprises:
determining a length of a data area, wherein the data area includes the first angle, the second angle, and the obtained measurement distances;

packetizing the acquired data to generate a target data packet including the length, the first angle, the second angle, and the obtained measurement distances.

14. The radar device of claim 13, wherein, the processor is configured to execute a program corresponding to the executable program codes by reading the executable program codes stored on the memory to perform the following steps:

obtaining a rotation speed of the radar device;

the data area further includes the rotation speed;

wherein packetizing the acquired data to generate a target data packet including the length, the first angle, the second angle, and the obtained measurement distances comprises:

packetizing the acquired data in combination with the rotation speed to generate a target data packet including the length, the first angle, the second angle, the obtained measurement distances and the rotation speed.

15. The radar device of claim 14, wherein, packetizing the acquired data in combination with the rotation speed to generate a target data packet including the length, the first angle, the second angle, the obtained measurement distances and the rotation speed comprises:

obtaining a packet header;

generating a check code according to the packet header, the length, the first angle, the second angle, the obtained measurement distances, and the rotation speed;

generating a target data packet including the packet header, the length, the first angle, the second angle, the obtained measurement distances, the rotation speed, and the check code.

16. The radar device of claim 12, wherein, after obtaining measurement angles and measurement distances acquired by the radar device at each of preset measurement points in rotating by a preset angle from the target location, the method further comprises:

for each of the obtained measurement distances, when the measurement distance is less than a first preset distance, setting the measurement distance to a first preset value, and when the measurement distance is greater than a second preset distance, setting the measurement distance to a second preset value, wherein the first preset distance is less than the second preset distance.

17. The radar device of claim 12, wherein, the preset angle=$Max_A/N$, wherein N is a positive integer.

18. The radar device of claim 12, wherein, after obtaining a measurement angle and a measurement distance acquired by the radar device at each of preset measurement points in rotating a preset angle from the target location, the processor is configured to execute a program corresponding to the executable program codes by reading the executable program codes stored on the memory to perform the following steps:

re-determining the target location and performing the step of obtaining a measurement angle and a measurement distance acquired by the radar device at each of preset measurement points in rotating a preset angle from the target location in parallel with the step of packetizing the acquired data to generate a target data packet including the first angle, the second angle, and the obtained measurement distances.

19. The radar device of claim 12, wherein, determining a starting data acquisition location as a target location comprises:

determining a location corresponding to a third angle as the starting data acquisition location, wherein the third angle is an ending measurement angle included in a data packet transmitted to the destination device last time.

20. The radar device of claim 12, wherein, transmitting the target data packet to the destination device comprises:

transmitting the target data packet to the destination device via a preset serial port.

* * * * *